United States Patent [19]

Seitz

[11] Patent Number: 4,527,301
[45] Date of Patent: Jul. 9, 1985

[54] SIDE VIEW MIRROR TRUCK WINDSHIELD WIPER

[76] Inventor: John E. Seitz, 1845 Center, High Ridge, Mo. 63049

[21] Appl. No.: 610,126

[22] Filed: May 14, 1984

[51] Int. Cl.[3] .............................................. B60S 1/10
[52] U.S. Cl. ................................. 15/250 B; 15/250.29
[58] Field of Search .......... 15/250 B, 250.29, 250.26, 15/246; 350/582

[56] References Cited

U.S. PATENT DOCUMENTS

| | | | |
|---|---|---|---|
| 3,526,920 | 9/1970 | Boyanich | 15/250.29 |
| 3,618,156 | 11/1971 | Riggs | 15/250.29 |
| 3,685,087 | 8/1972 | Pittman | 15/250 B |
| 3,855,661 | 12/1974 | Prince | 15/250 B |
| 3,866,258 | 2/1975 | DeGraw | 15/250.29 |
| 3,968,537 | 7/1976 | Wagenhuffer | 15/250.29 |
| 4,037,286 | 7/1977 | Medaris | 15/250.29 |
| 4,212,091 | 7/1980 | Jones | 15/250.29 |
| 4,307,082 | 12/1981 | Palmer | 15/250.29 |
| 4,339,169 | 7/1982 | Addison | 15/250.29 |

Primary Examiner—Peter Feldman
Attorney, Agent, or Firm—Glenn K. Robbins

[57] ABSTRACT

A windshield wiper and wiper support frame for extended side view mirrors for trucks and the like. The windshield wiper is supported upon a U-shaped frame fitted between the mirror and the truck and having legs secured to the mirror on lugs which extend from the mirror and provide for a pivotal connection for a standard mirror support frame connected to a truck. The windshield wipe is comprised of a pneumatic cylinder supported on the wiper support frame. A reciprocable piston has an operating rod connected by a connecting head to the blade for quick connection. Push-pull single stroke operation of the wiper across the face of the mirror for reciprocal wiping action is provided by remote control valve means positioned inside the truck cab for control of pneumatic pressure provided through air lines connecting the cylinder with a standard source of pneumatic pressure. The wiper support frame is connected with the mirror in a coplanar relation and may be used as a handle to adjust the mirror as the mirror and wiper support frame are secured together as a unit.

11 Claims, 4 Drawing Figures

SIDE VIEW MIRROR TRUCK WINDSHIELD WIPER

BACKGROUND OF THE INVENTION

In the past there has existed a problem in providing clear side view mirrors in inclement weather. This problem has been particularly severe for trucks, especially where large semi-trailers or the like are employed with the extended frame side view mirrors. Such mirrors are supported a substantial distance from the truck in order to present a clear rear view to the driver of the semi-trailer to the rear of the truck. While it is possible for the driver to lower the window on the driver's side the width of the cab in large trucks effectively prevents the driver reaching over and from cleaning the mirror supported on the passenger's side of the truck while in transit.

Various devices have been provided in the art. While some of these devices provide for reciprocatory movement of a wiper blade on the usual rectangular side view truck mirror they have generally been of complex structure, requiring special mirror construction and have made it difficult to adjust the mirror with the attached wiper construction. Further, installation has been of a type not lending itself to ready attachment of a wiper to a standard side view mirror in the field by a driver.

SUMMARY OF THE INVENTION

By means of this invention there has been provided a readily and simply attachable side view mirror wiper which can be fitted on a standard side view mirror of the type employed in trucks. The wiper is of the pneumatic type which can be operated by the driver from a remote position within the truck to clear the most troublesome mirror on the passenger's side or in addition the driver's side as desired.

The wiper of this invention is pneumatically operated from the conventional high pressure air source that is commonly found in large trucks to operate air brakes and the like. An air cylinder is used to reciprocate a piston and external operating rod having a connecting head adapted to support a conventional wiper blade. A remote control selector valve is positioned inside the cab in order that the driver may control the pneumatic cylinder in a push and pull reciprocatory operation. The valve provides a single stroke push or pull operation and may be varied in its force by adjustable bleeder ports.

The pneumatic cylinder is supported on a specially devised mirror support frame. The frame is coplanar with the mirror and supports the wiper in engagement with the mirror and is adjustable to maintain the proper engaging relationship of the wiper blade to the mirror.

The frame is a generally U-shaped construction having legs which are simply connected to the pivot lugs extending from the side of the mirror. Such pivot lugs are of standard construction to connect the mirror to a conventional tubular frame or the like fixed to the side of the truck.

The entire wiper and cylinder and frame are simply connected by interfitting slots or holes at the ends of the wiper support frame to the pivot lugs and securing the frame to the mirror by tightening nuts. Extended portions of the lugs connect the entire mirror and wiper and wiper support frame to the conventional mirror support frame connected to the side of the truck.

The wiper support frame has an end or bight portion supporting one end of the pneumatic cylinder and a cross brace supporting an opposite end of the cylinder. The frame extends from the mirror toward the truck in the open space provided in the standard mirror support frame which provides a protected space for the wiper frame and wiper cylinder. This structure further provides for the use of the frame as a handle which the driver can use to adjust the mirror. In such adjustment the wiper and cylinder move with the mirror as a unit and independent or separate adjustment is not required.

Since the wiper, pneumatic cylinder and wiper support frame may be connected together as a unit the installation is extremely simple. The only connection to the standard mirror and mirror support frame required is the interfitting of the ends of the wiper support frame legs over the mirror lugs and securing the tightening nuts.

The wiper and support frame of this invention are of rugged construction, simply fabricated and simply installed and used in the field. The simple and relatively inexpensive nature of fabrication makes wider use and consequent increase in safety a significant advantage.

The above features are objects of this invention. Further objects will appear in the detailed description which follows and will be further apparent to those skilled in the art.

For the purpose of illustration of this invention preferred embodiments thereof are shown in the accompanying drawing. It is to be understood that the drawing is for purpose of description only and that the invention is not limited thereto.

IN THE DRAWING

DESCRIPTION OF THE INVENTION

Figure 1:
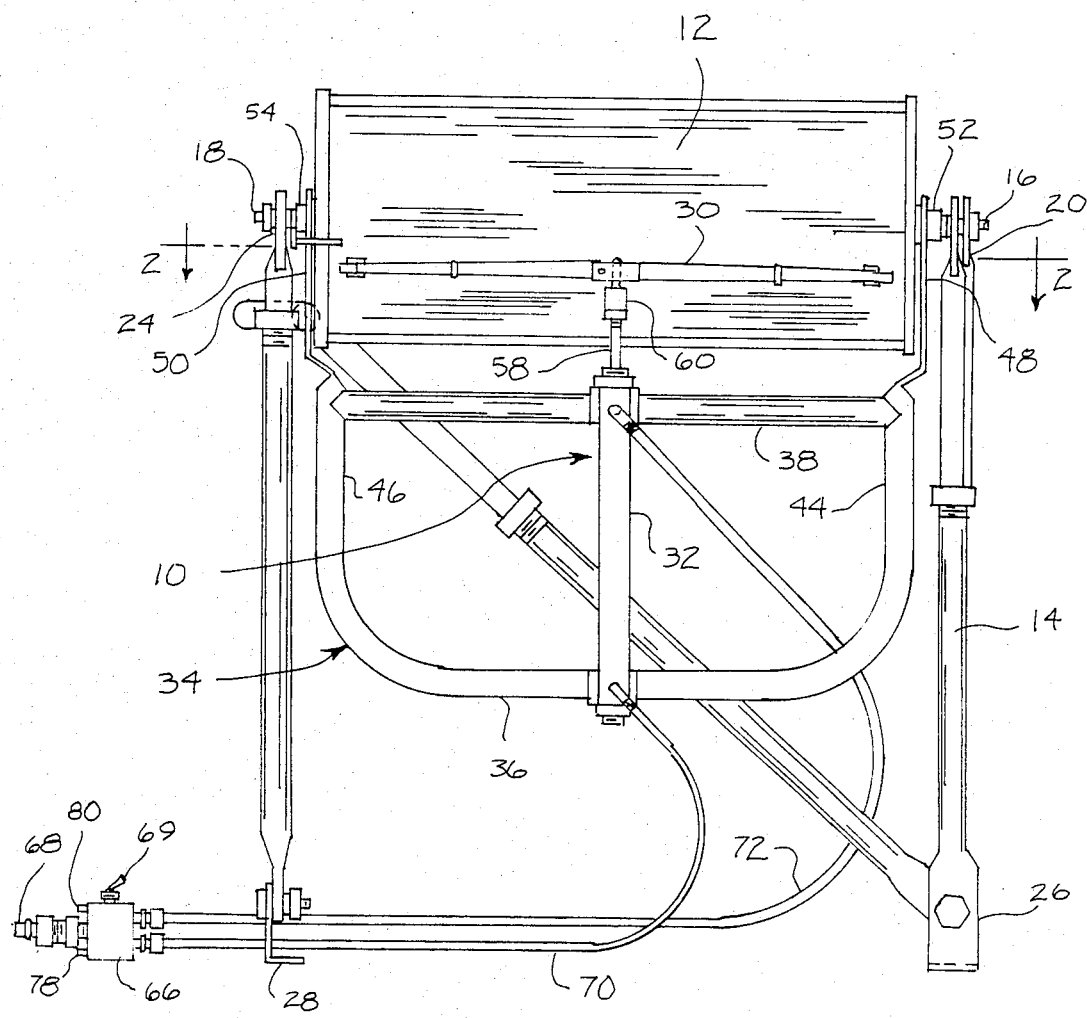
FIG. 1 is a view in side elevation of a truck side view mirror equipped with the support bracket and windshield wiper of this invention.
Figure 2:
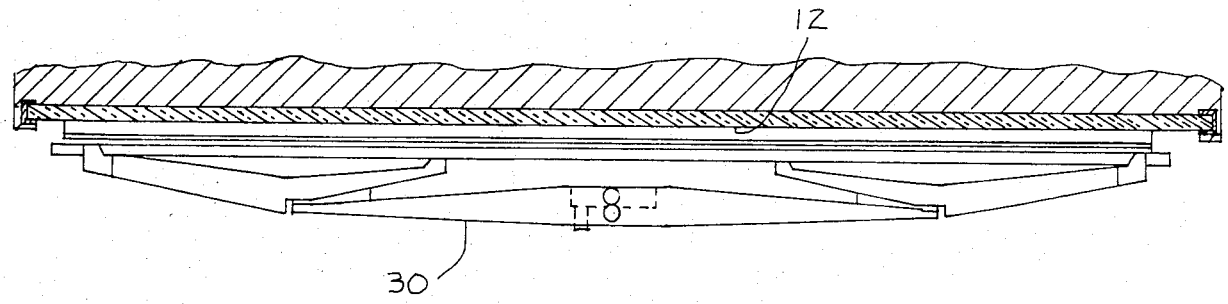
FIG. 2 is a view in section of the mirror and wiper taken on the line 2—2 of FIG. 1.
Figure 3:
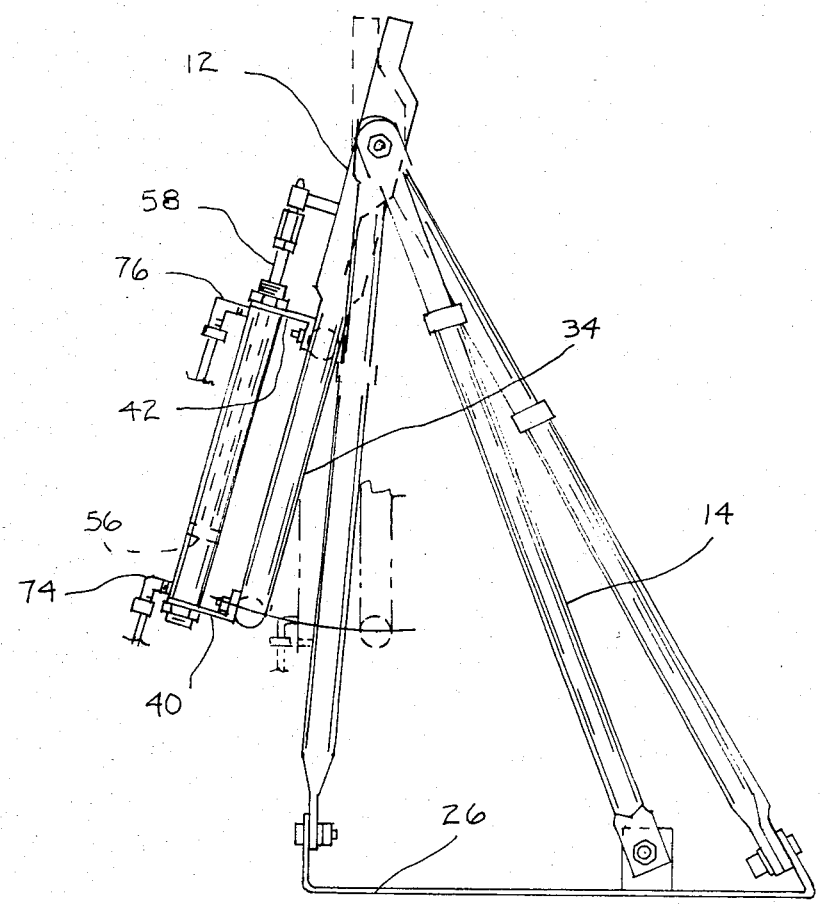
FIG. 3 is a top plan view of the side view mirror and the windshield wiper with its support bracket.

The wiper of this invention is generally designated by the reference numeral 10 in FIGS. 1 and 3 and as there shown is attached to a standard side view mirror 12 and mirror support frame 14.

The side view mirror is of the usual rectangular construction having a pair of threaded support lugs 16 and 18 extending from the top and bottom of the mirror. These lugs support the mirror for pivotal relation within the extended ends 20 and 24 of the support frame. Opposed ends 26 and 28 of the mirror support frame are adapted to be connected to the side of the truck in the usual fashion. The above construction is typical for extended side view truck mirrors and is employed for the support of the wiper of this invention.

The wiper 10 is comprised of a wiper blade 30 operated by a pneumatic cylinder 32 supported upon a wiper support frame 34. The wiper support frame supports the entire wiper blade and pneumatic cylinder construction and provide a simple means for ready attachment to the mirror 10.

The wiper support frame 34 is best shown in FIG. 1 and as there shown is of a generally tubular rigid U- shaped construction. The frame has an end or bight portion 36 which serves as a handle as will be later described for mirror adjustment and to connect one end of the pneumatic cylinder. A cross brace 38 supports an opposite end of the cylinder. Both connections are by saddle clamps 40 and 42 respectively fitting over the cylinder and fixed to the support frame.

The U-shaped frame has legs 44 and 46 having flattened ends 48 and 50. The ends have slots or openings (not shown) which interfit over the mirror support lugs 16 and 18. Tightening nuts 52 and 54 provide for securing the wiper support frame tightly to the mirror in order that the frame may be grasped at the bight 36 or elsewhere to move the frame and mirror as a unit should the mirror need adjustment.

The pneumatic cylinder is provided with a conventional piston 56 shown in dotted lines in FIG. 3. It is connected to an operating rod 58 extending externally from the piston.

Figure 4:
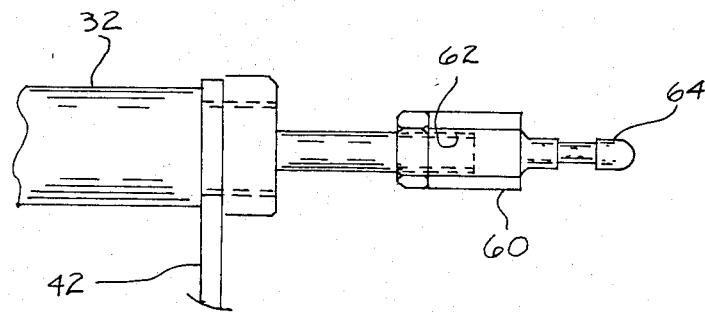
FIG. 4 is an enlarged view in side elevation of the cylinder and piston showing the piston and wiper connecting head.

A specially constructed connecting head 60 shown in FIG. 4 has an internally threaded socket 62 which is connected to a threaded end of the operating rod. A ball-like head 64 is formed at the end of the connecting head. The ball-like head is adapted to interfit with a conventional quick release socket (not shown) in the wiper blade for ready attachment and replacement as required.

The control and operation of the wiper of this invention is effected by a remotely positioned valve 66 which may be located within the cab of the truck. High pressure air is introduced through the valve through an air line 68 which as will be readily understood is connected to a conventional source of high pressure otherwise provided in the truck such as for standard operation of air brakes and the like. The valve 66 has a two-way switch 69 which controls the admission of air through air line 70 and 72 to ports 74 and 76 at the opposite ends of the pneumatic cylinder as best shown in FIGS. 1 and 3. The valve is further provided with bleeder ports 78 and 80 to vary the relief pressure on the opposite sides of the piston to control the force and speed of the piston.

OPERATION

The wiper of this invention is very simply installed on a conventional side view mirror and mirror support frame. This is effected by simply loosening the nuts at the ends of the mirror lugs 16 and 18 which secure the mirror to mirror support frame 14.

With this accomplished the wiper as a unit and mounted on the wiper support frame 34 is mounted on the lugs 16 and 18 with the flattened ends 48 and 50 of the frame positioned on the support lugs between the mirror and the securing nuts 52 and 54 which are backed off. The securing nuts are then tightened to secure the entire wiper assembly to the mirror and mirror support frame ensuring that the entire wiper is coplanar with the mirror and that the wiper blade 30 is in proper engagement with the mirror. The installation may also be effected with the wiper blade being removed and connected to the connecting head 60 afterwards. Before tightening the nuts proper coplanar relationship and wiper blade engagement may be perfected by pivoting the wiper support frame about the lugs to ensure the proper relationship. After the aforementioned connections are effected the mirror support frame securing nuts at the ends of the lugs are tightened to complete the installation.

The afore-mentioned installation is simply effected in the field. Only a wrench or pair of pliers are required and it will be understood that the installation or removal may be accomplished without complication.

The valve 66 may be simply mounted at any convenient location within the cab of the truck. The air lines provide the pneumatic power necessary for operation through the valve of the cylinder 32 and the wiper blade 30.

The movement of the wiper blade in the single push stroke is effected by operating the valve switch 69 to admit air through air line 70 to port 74 to the rear of the piston. This causes a forward stroke of the piston and operating rod to push the wiper blade across the mirror. The return or pull stroke is effected by a reverse operation of the switch 69 to provide pneumatic pressure to the front of the piston through air line 72. This push-pull single stroke may be repeated as often as necessary. The bleeder ports may be adjusted as necessary to vent the relief pressure on the low pressure side of the piston as will be readily understood.

Should it be necessary to adjust the mirror to change the rear view angle, the wiper support frame 34 may be used as a handle to effect the adjustment. Through the secure connection of the wiper support frame to the mirror they move together as a unit. The wiper support frame fits within the space provided between the mirror and the truck and is readily grasped about the bight 36 or the legs of the frame as desired. The enclosed area within the mirror support frame also provides boundary protection to the wiper and its support frame and pneumatic cylinder.

Various changes and modifications may be made within this invention as will be apparent to those skilled in the art. Such changes and modifications are within the scope and teaching of this invention as defined in the claims appended hereto.

What is claimed is:

1. A windshield wiper for a side view mirror for trucks in which the side view mirror is pivotally supported by a pair of lug elements extending from the top and bottom of the mirror and pivotally connecting the mirror to a mirror support frame connected to a cab of the truck, said windshield wiper comprising a windshield wiper support frame pivotally connected to said lug elements and having a body portion extending between the mirror and the cab, a pneumatic cylinder rigidly connected and moveable with said wiper support frame, a reciprocable piston supported within said cylinder having an external operating rod, means for connecting an external end of said operating rod to a windshield wiper blade engageable with a surface of the mirror, flexible conduit connecting said pneumatic cylinder with a source of pneumatic pressure in the truck and valve means connected to said flexible conduits located within the truck cab for providing a single throw push pull operation of the pneumatic cylinder and the windshield wiper.

2. The windshield wiper of claim 1 in which the wiper support frame is comprised of a U-shaped rigid member having legs connected to said mirror lug elements and a bight portion connected to a rear portion of said pneumatic cylinder and a rigid cross brace extending between said legs connected to a forward portion of the pneumatic cylinder.

3. The windshield wiper of claim 2 in which the wiper support frame is connected to said lug elements in coplanar relation with the mirror and extends substantially beyond a truck side of said mirror toward a side of the truck to which said mirror support frame is connected.

4. The windshield wiper of claim 3 in which said wiper support frame is rigidly connected to said mirror and said wiper support frame is moveable about said lugs with said mirror as a unit to provide mirror adjustment as necessary.

5. The windshield wiper of claim 4 in which said bight of the U-shaped frame is spaced from said mirror and mirror support frame a sufficient distance to provide clearance for a driver's hand in order that it may be grasped as a handle to adjust said mirror.

6. The windshield wiper of claim 1 in which said valve means has piston single stroke selector means for selectively providing pneumatic pressure on opposite sides of the piston to push the wiper blade across the mirror in a push stroke and pull the blade back in a pull stroke.

7. The windshield wiper of claim 6 in which said valve means is provided with bleeder means for varying the pneumatic pressure on opposed sides of said piston to vary the piston and blade movement.

8. The windshield wiper of claim 5 in which said bight is positioned substantially medially between the mirror and an end of said mirror support frame adapted to be connected to the truck.

9. The windshield wiper of claim 1 in which a wiper blade connecting head is connected to the external end of the operating rod and is provided with a ball-like end receivable within a socket of the wiper blade.

10. The windshield wiper of claim 9 in which the connecting head has an internally threaded socket threadably receivable in a threaded external end of the operating rod.

11. The windshield wiper of claim 4 in which free ends of said wiper support frame legs are receiveable upon said lug elements and are secured to said mirror by tightening nuts interiorly of the pivotal connection of the mirror support frame to said lug elements.

* * * * *